No. 856,246.  
PATENTED JUNE 11, 1907.  
E. E. GAMON.  
NUT RING.  
APPLICATION FILED SEPT. 12, 1906.
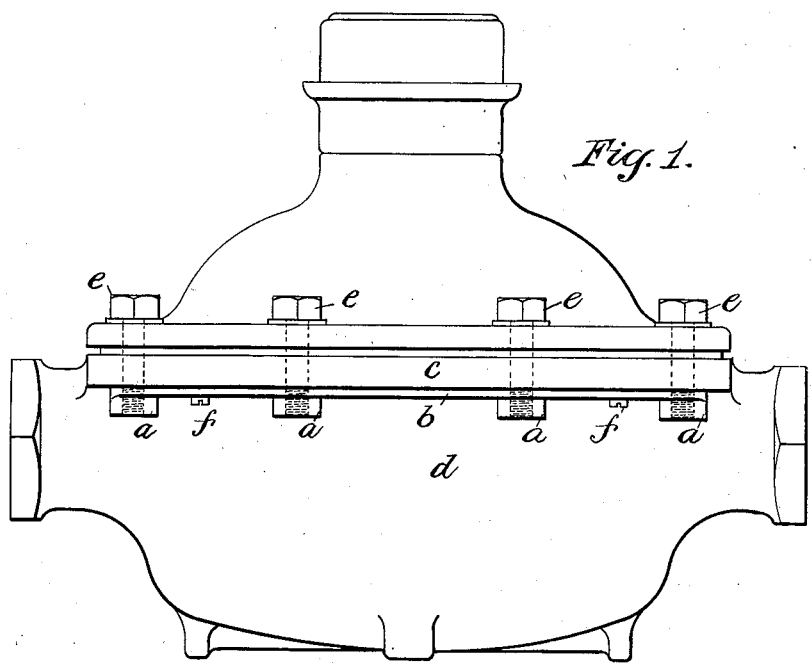
Fig. 1.
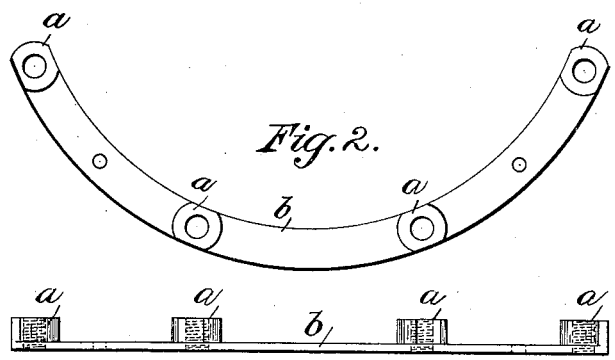
Fig. 2.
Fig. 3.
WITNESSES:  
INVENTOR  
Ernest E. Gamon.  
BY  
Fischer & Sanders.  
ATTORNEYS.

UNITED STATES PATENT OFFICE.

ERNEST E. GAMON, OF LONG ISLAND CITY, NEW YORK, ASSIGNOR TO NEPTUNE METER COMPANY, OF LONG ISLAND CITY, NEW YORK, A CORPORATION OF NEW JERSEY.

NUT-RING.

No. 856,246.          Specification of Letters Patent.          Patented June 11, 1907.

Application filed September 12, 1906. Serial No. 334,234.

*To all whom it may concern:*

Be it known that I, ERNEST E. GAMON, a citizen of the United States, residing at Long Island City, in the county of Queens and State of New York, have invented certain new and useful Improvements in Nut-Rings; and I do hereby declare the following to be a full, clear, and exact description of the same, such as will enable others skilled in the art to which it pertains to make and use the same.

The object of my invention is to provide a series of screw threaded nuts spaced apart and integrally connected together by means of a thin and frangible supporting plate in convenient form for use on flanged pipe connections, and similar flanged mechanism, in connection with bolts for holding such parts in rigid union, and the use of my device results in a very considerable saving of time in the uniting of such parts together, and also in making such connections in a much more convenient manner than has heretofore been the case.

In the accompanying drawings, forming a part of this specification, Figure 1 represents my improvement as applied to the flange of a water meter. Fig. 2 is a plan view, and Fig. 3 is a side view of the detached nut ring.

Similar letters of reference refer to like parts throughout the specification and drawings.

In carrying out my invention, I make use of the series of threaded nuts $a$ integrally connected together by the supporting plate $b$, said plate being flat so as to lie closely against the flange $c$ of the parts to be united, and preferably cast of thin and frangible material. The supporting plate $b$ is made to conform to the body $d$ of the tube, pipe or other part to which the device is applied, when the threaded bolts $e$ are inserted through the holes in the flanges and screwed home. In practice, two of the supporting plates $b$ are provided for each connection for facility in application, each part being substantially semi-circular.

I find this device particularly adapted for use in uniting the parts or members of a water meter, which ordinarily is located in a pit where it is inconvenient to reach the under side of the flanges $c$ for the application of separate nuts. In this case, the device may be secured to the under side of the flange in any convenient manner as by the small screws $f$ and held in position until one or two of the bolts are screwed through the flanges $c$ into the nuts $a$, when it will be found that the other bolts may be applied without attention to the holding of the corresponding nuts in position. It is in such connection that the greatest inconvenience is met with in the application of bolts and nuts of the old type. It frequently happens in attempting to secure the nut to the end of the bolt, that the said nut will slip from the hand of the operator and fall into the pit and cause great annoyance in the recovery of the same. By the use of my device, all of the nuts are brought into registry with the bolt holes and when one bolt has been secured in the place, it will be found that all of the bolts may be screwed into position without further attention to the corresponding nuts. A further point may be mentioned in the fact that the nuts $a$ being all integrally connected by the supporting plate $b$, no inconvenience is experienced in the turning of the nuts, while screwing the bolts into them as is often the case where independent nuts are used.

It will be readily seen that the device may be used in other relations than with a water meter as for example, in connecting the flanges of steam or water pipes or different parts of other mechanism which are ordinarily held together by a series of bolts.

Should the threads of any of the nuts become stripped from any cause, said nut may be broken out of the ring and a new independent nut substituted, the supporting plate being made thin and frangible for this purpose. If desired, the nuts may be connected together in pairs instead of greater numbers, the invention residing materially in the connection of two or more screw threaded nuts by an integral base plate.

I claim:

1. As a new article of manufacture, the combination of a plurality of nuts spaced apart and connected together by means of a thin and frangible supporting plate.

2. As a new article of manufacture, the combination of a plurality of nuts spaced apart and connected together by means of a thin and frangible curved supporting plate.

This specification signed and witnessed this 7th day of Sept. 1906.

ERNEST E. GAMON.

Witnesses:
C. E. WENZEL,
FRED'K C. FISCHER.